United States Patent
Aspin

(10) Patent No.: US 10,662,281 B2
(45) Date of Patent: May 26, 2020

(54) COMPOSITE PANEL MATERIAL

(71) Applicant: CYTEC INDUSTRIAL MATERIALS (DERBY) LIMITED, Heanor (GB)

(72) Inventor: Ian Aspin, Belper (GB)

(73) Assignee: CYTEC INDUSTRIAL MATERIALS (DERBY) LIMITED, Heanor (GB)

( * ) Notice: Subject to any disclaimer, the term of this patent is extended or adjusted under 35 U.S.C. 154(b) by 0 days.

(21) Appl. No.: 15/761,462

(22) PCT Filed: Sep. 23, 2016

(86) PCT No.: PCT/EP2016/072742
§ 371 (c)(1),
(2) Date: Mar. 20, 2018

(87) PCT Pub. No.: WO2017/050995
PCT Pub. Date: Mar. 30, 2017

(65) Prior Publication Data
US 2019/0048128 A1  Feb. 14, 2019

Related U.S. Application Data

(60) Provisional application No. 62/232,591, filed on Sep. 25, 2015.

(51) Int. Cl.
| | | |
|---|---|---|
| *B29C 70/34* | (2006.01) | |
| *B29C 70/06* | (2006.01) | |
| *B29C 69/00* | (2006.01) | |
| *B29C 53/56* | (2006.01) | |
| *C08J 5/24* | (2006.01) | |
| *C08G 59/50* | (2006.01) | |
| *C08G 59/56* | (2006.01) | |
| *C08G 59/40* | (2006.01) | |
| *C08J 5/04* | (2006.01) | |

(52) U.S. Cl.
CPC ............ *C08G 59/56* (2013.01); *B29C 53/564* (2013.01); *B29C 69/00* (2013.01); *B29C 70/06* (2013.01); *B29C 70/347* (2013.01); *C08G 59/5006* (2013.01); *C08G 59/5073* (2013.01); *C08J 5/24* (2013.01); *C08J 5/042* (2013.01); *C08J 2363/00* (2013.01)

(58) Field of Classification Search
None
See application file for complete search history.

(56) References Cited

U.S. PATENT DOCUMENTS

| | | | |
|---|---|---|---|
| 3,352,813 A | 11/1967 | Hayes | |
| 3,489,695 A | 1/1970 | Green | |
| 3,902,944 A * | 9/1975 | Ashton | ................. B29C 53/584 |
| | | | 156/156 |
| 4,299,938 A * | 11/1981 | Green | ...................... C08G 8/28 |
| | | | 522/11 |
| 4,423,094 A | 12/1983 | Dearlove et al. | |
| 4,528,308 A | 7/1985 | Waddill | |
| 4,892,764 A * | 1/1990 | Drain | ..................... B29C 35/02 |
| | | | 156/161 |
| 2012/0328811 A1 | 12/2012 | Patel et al. | |
| 2014/0171551 A1* | 6/2014 | Patel | ..................... C08G 59/50 |
| | | | 523/447 |

FOREIGN PATENT DOCUMENTS

| | | |
|---|---|---|
| EP | 0239246 A1 | 9/1987 |
| EP | 2746328 A1 | 6/2014 |
| EP | 2826801 A1 | 1/2015 |
| JP | 2006143759 A | 6/2006 |
| WO | 2009084718 A1 | 7/2009 |
| WO | 2013130378 A1 | 9/2013 |
| WO | 2016193821 A1 | 12/2016 |
| WO | 2017030988 A1 | 2/2017 |

* cited by examiner

*Primary Examiner* — Michael J Feely
(74) *Attorney, Agent, or Firm* — Thi Dang

(57) ABSTRACT

A curable resin composition containing: (a) at least one resin; and (b) curative selected from the group consisting of (i) a mixture of at least one low temperature curative and at least one high temperature curative or (ii) a curative that has a low temperature curative part and a high temperature curative part wherein the amount of the low temperature curative is sufficient to cause enough resin-curative addition reaction to effect B-staging in the full resin-curative formulation, the amount of the high temperature curative is sufficient to cause the resin to cure catalytically but insufficient to cause resin-curative addition reaction in the final cure, and the ratio of the resin (a) to the curative (b) is greater than or equal to about 5. The present composition may be used to make prepregs for automotive or aerospace application.

13 Claims, 8 Drawing Sheets

COMPOSITE PANEL MATERIAL

CROSS-REFERENCE TO RELATED APPLICATIONS

The present application is a U.S. national phase entry under 35 U.S.C. § 371 of International Application No. PCT/EP2016/072742, filed on 23 Sep. 2016, which claims priority to U.S. provisional Application No. 62/232,591, filed on 25 Sep. 2015, the entire content of each of these applications is explicitly incorporated herein by reference.

BACKGROUND

The automotive industry has used fibre reinforced composites (FRC) for parts of automobiles, especially high performance cars, and trucks for many years. The use of high speed manufacturing technologies allows carbon fibre reinforced composites (CFRP) to move into serial production vehicles. One such technique is rapid cure press moulding. The substrates used in this process could be from prepreg or from filament wound structures. In the latter, tows of carbon fibre, either pre-impregnated with resin or, more commonly, impregnated in-line, are wound around a rotating mandrel. As the winding head is moved back and forth along the mandrel, it allows a variety of woven structures with numerous interlocking angles to be constructed. The removal of the woven structure from the mandrel creates rectangular "blanks" that can be used as the substrates for rapid press curing in a similar way to prepreg materials.

The industry desires to have such high performance filament winding (FW) resins that can be rapidly processed in order to contain costs and achieve the high throughputs required for serial production. Some of the known resins have low viscosity so as to facilitate impregnation of the fiber. However, we have identified several problems with current filament winding resins. One is that the resins have such low reactivity and viscosity that the materials remain fluid and sticky during handling. This fluidity allows the filament positions to shift and skew altering the woven alignment and angles during and after winding. This could ultimately affect the mechanical performance if the part is stressed in a particular direction. Another problem is that with low reactivity, the products do not cure quickly and cure cycles of hours are generally needed to reach >95% reaction. Generally, the low reactivity resins employed in FW processes do not achieve high glass transition temperatures (e.g. >approx. 100-110° C.) after curing.

Thus, if the automotive industry adopts FW technology, the automotive industry will need filament winding resins that provide low viscosity for easy fibre tow impregnation, a higher viscosity after winding to minimize fibre tow distortion and improve handling characteristics, demonstrate fast cure capability whilst achieving an acceptable high glass transition (Tg) temperature on final cure.

SUMMARY

The present disclosure describes a curable resin composition comprising: (a) at least one thermosettable resin; and (b) a curative selected from the group consisting of (i) a mixture of at least one low temperature curative and at least one high temperature curative or (ii) a curative that has a low temperature curative part and a high temperature curative part wherein the amount of the low temperature curative is sufficient to cause enough resin-curative addition reaction to effect B-staging in the full resin-curative formulation, the amount of the high temperature curative is sufficient to cause the resin to cure catalytically but insufficient to cause resin-curative addition reaction in the final cure, and the ratio of the resin (a) to the curative (b) is greater than or equal to about 5.

DETAILED DESCRIPTION

Figure 1:
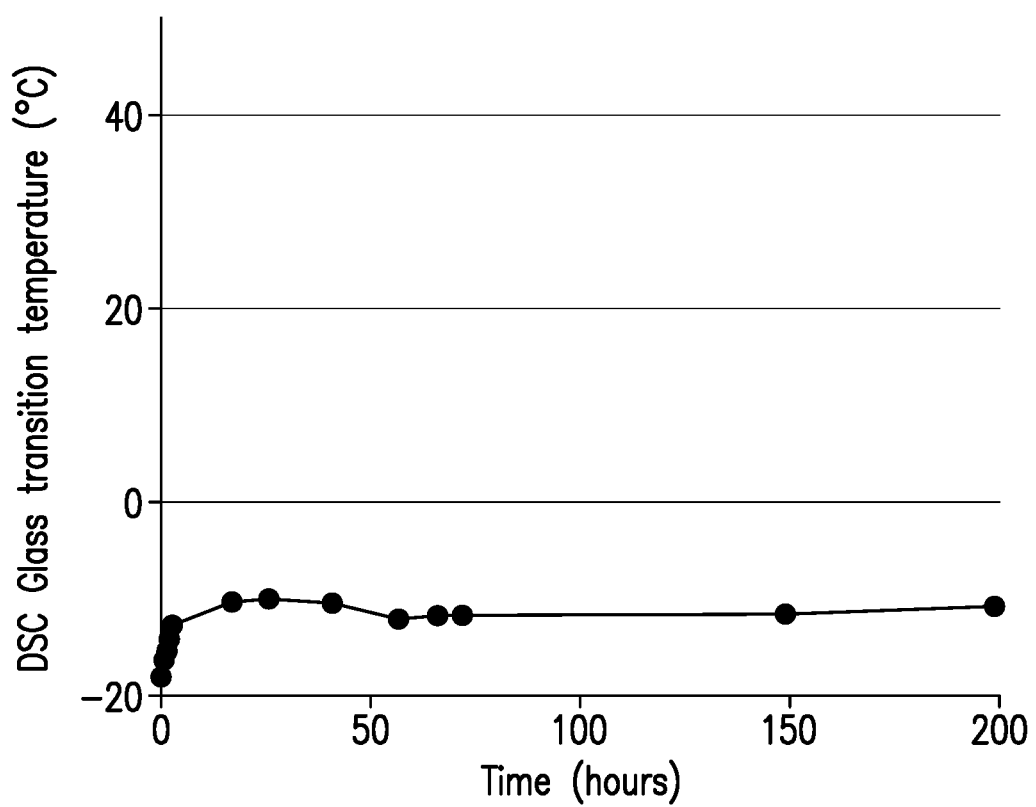
FIG. 1 is shows the development of B-stage Tg with time of Comparative A.

"Cured glass transition temperature" means the initial drop in elastic modulus (E') measured by dynamic mechanical analysis (DMA) determined by intersections of tangents to the curve (as described in ASTM7028-07).

"Uncured glass transition temperature" means the step change in heat flow due to changes in heat capacity measured by dynamic scanning calorimetry (DSC) determined by intersections of tangents to the curve (as described in ISO11357-2:2013).

"B-stage" means to partially cure a material to an isolatable intermediate state such that it can still be stimulated (by heat or radiation or any other means) to achieve a maximum cured state.

"RT" stands for room temperature (about 23° C. to about 25° C.).

"HT" stands for high temperature.

Curatives: The curative is selected from the group consisting of (i) a mixture of at least one low temperature curative and at least one high temperature curative or (ii) a curative that functions as both a low temperature curative and a high temperature curative. Some embodiments of the present disclosure uses a combination of curatives including a first curative that cures resin and is consumed rapidly at room temperature and a second curative that cures resin slower than the first curative at RT but is rapid at a temperature higher than room temperature. The amount of room temperature ("RT") curative is sufficient to cause enough resin-curative addition reaction to effect B-staging in the full resin-curative formulation. The amount of the high temperature curative is sufficient to cause the resin to cure catalytically but insufficient to cause resin-curative addition reaction in the final cure. Preferably the ratio RT:HT is about 1:10 to about 10:1 and more preferably, about 1:2 to about 2:1 by weight. The most preferred ratio RT:HT is about 1:1 to about 2:1.

The first and second curatives are first mixed together and may be stored before mixing with the resin. The two curatives are mixed together at ambient temperatures if possible by simple mechanical means either by motorized stirrer, magnetic stirrer by centrifugal mixers. If one or more curatives are solids at ambient conditions they can be melted prior to addition, or dissolved in a liquid partner. It may be necessary to warm one component in order to dissolve a solid second component. In all cases, a complete solution with no particulate matter is obtained. This ensures that adequate, sufficient and rapid mixing with the resin component can be achieved.

Useful room temperature curatives cure standard epoxies, such as bisphenol A type epoxies, at a temperature of about 10° C. to about 40° C. and are typically aliphatic materials. Examples of preferred room temperature curatives include isophorone diamine ('IPDA'); trimethylhexamethylene diamine; diethylenetriamine ('DETA'); triethylenetetramine ('TETA'); tetraethylenepentamine ('TEPA'); TCD-diamine; N,N-dimethylpropane-1,3-diamine; N,N-diethylpropane-1,3-diamine; 1,2-diaminocyclohexane; 1,3-diaminocyclohexane; 1,3-bisaminocyclohexylamine; 1,3-bis(aminomethyl)cyclohexane ('1,3-BAC'); 1,2-bis(aminomethyl) cyclohexane; 4,4'-methylenebis(cyclohexylamine); 4,4'-methylenebis(2-methylcyclohexylamine); N-aminoethylpiperazine ('AEP'); Bis(aminopropyl)piperazine ('BAPP'); 4,7,10-trioxatridecane-1,13-diamine ("TTD"); and other low poly(oxyalkyl)diamines. These low viscosity curatives facilitate impregnation of the resin into the filament and rapidly increase the viscosity of the mix after doing so.

Useful high temperature curatives that cure rapidly at a temperature of 40° C. to 200° C. are typically non-linear, non-aliphatic materials. Examples of preferred high temperature curatives including many imidazole derivatives such as substituted imidazoles, preferably wherein the substituent groups of said substituted imidazoles are or comprise alkyl and/or aryl substituent groups, and preferably the liquid curative is selected from 1-cyanoethyl-2-ethyl-4-methylimidazole ("EMPI"), 2-ethyl-4-methylimidazole ("EMI"), 1-cyanoethyl-2-methylimidazole, 1-methyl imidazole, 4-methyl imidazole, 1-benzyl-2-phenylimidazole, 1-benzyl-2-methylimidazole, 1-(3-aminopropyl)imidazole ("API"), 1,2-dimethylimidazole, 1-cyanoethyl-2-undecylimidazole, and 4,5-bis[(2-cyanoethoxy)methyl]-2-phenyl-1H-imidazole-1-propiononitrile. These curatives are responsible for final cure and provide high cured glass transition temperatures. In one embodiment, the high temperature curative does not contain primary amines.

Other HT curatives include, but are not limited to, 3,3'-diaminodiphenylsulfone ('33DDS'); 4,4'-diaminodiphenylsulfone ('44DDS'); derivatives of diaminodiphenylmethane ('DDM') such as 4,4'-methylenebis-(2,6-diethyl)-aniline ("MDEA"), 4,4'-methylenebis-(2-isopropyl-6-methyl)-aniline ("M-MIPA"), dicyandiamide ('Dicy'); and all isomers of diethyltoluene diamine ('DETDA'). However, their reactivity is rather low and curing with suitable accelerators and/or catalysts is normally required.

Other curatives may act in a dual function of both RT and HT curatives in the same compound. Such compounds have two functional groups and include but are not limited to N-aminoalkylimidazoles (for example, N-(3-aminopropyl) imidazole) ("API"), N,N-diethylpropane diamine ("DEPD") and N,N-dimethylpropane diamine ("DMPD"). In such cases, one part of the compound acts as the RT curative (for example the primary amine in API, DEPD, DMPD) and another part as the catalytic HT curative (for example the imidazole in API, the tertiary amine in DEPD and DMPD).

Resins: The curable resin comprises one or more curable thermosetting resin(s). The formulation of the curable resin can be specified to achieve the optimum performance for the intended use of the pre-pregs. Curable resins suitable for use in the present disclosure are preferably selected from the group consisting of epoxy resins and resins comprising vinyl groups such as vinyl ester resins, and mixtures thereof. Preferably the curable resin is selected from epoxy resins. An epoxy resin is preferably an epoxy resin derived from the mono or poly-glycidyl derivative of one or more of the group of compounds consisting of aromatic diamines, aromatic monoprimary amines, aminophenols, polyhydric phenols, polyhydric alcohols, polycarboxylic acids and the like, or a mixture thereof.

The particularly preferred epoxy resins may be monofunctional or multifunctional epoxy resins. As used herein, the term "multifunctional" epoxy resin is a resin which has a functionality of greater than one. Preferred multifunctional resins are at least difunctional, trifunctional, or tetrafunctional, although epoxy resins having greater functionality may also be used, for instance those having 5 or 6 epoxy groups. The term "multi-functional" encompasses resins which have non-integer functionality, for instance epoxy phenol novolac (EPN) resins, as known in the art. The epoxy resin may comprise monofunctional, difunctional and/or multifunctional epoxy resins with greater functionality (e.g. trifunctional or tetrafunctional).

In a preferred embodiment, the curable resin comprises one or more difunctional epoxy resin(s). Preferably the curable resin comprises optionally one or more multifunctional resins, including one or more difunctional epoxy resin(s). In a preferred embodiment, the curable resin comprises one or more trifunctional epoxy resin(s) and/or one or more tetrafunctional epoxy resin(s) optionally in combination with one or more difunctional epoxy resin(s).

Suitable difunctional epoxy resins include those based on: diglycidyl ether of Bisphenol F, Bisphenol A (optionally brominated), phenol and cresol epoxy novolacs, glycidyl ethers of phenol-aldehyde adducts, glycidyl ethers of aliphatic diols, diglycidyl ether, diethylene glycol diglycidyl ether, aromatic epoxy resins, aliphatic polyglycidyl ethers, epoxidised olefins, brominated resins, aromatic glycidyl amines, heterocyclic glycidyl imidines and amides, glycidyl ethers, fluorinated epoxy resins, or any combination thereof. Difunctional epoxy resins are preferably selected from diglycidyl ether of Bisphenol F (DGEBF), diglycidyl ether of Bisphenol A (DGEBA), diglycidyl dihydroxy naphthalene, diglycidyl dihydroxyphenyl flourene ("fluorene epoxy",) or any combination thereof.

Suitable trifunctional epoxy resins, by way of example, may include those based upon phenol and cresol epoxy novolacs, glycidyl ethers of phenol-aldehyde adducts, aromatic epoxy resins, aliphatic triglycidyl ethers, dialiphatic triglycidyl ethers, aliphatic polyglycidyl ethers, epoxidised olefins, brominated resins, triglycidyl aminophenols, aromatic glycidyl amines, heterocyclic glycidyl imidines and amides, glycidyl ethers, fluorinated epoxy resins, or any combination thereof.

Suitable tetrafunctional epoxy resins include N,N,N',N'-tetraglycidyl diamino diphenylmethane ("TGDDM") and N,N,N',N'-tetraglycidyl-m-xylenediamine ("TGMXDA"), and tetraglycidyltetraphenylethane ("TGTPE").

In a preferred embodiment, the curable resin is selected from curable resins which comprise: (i) a first difunctional epoxy resin, preferably selected from bisphenol A or bisphenol F epoxy resins, and preferably DGEBA; and/or (ii) a second difunctional epoxy resin, preferably selected from bisphenol A or bisphenol F epoxy resins, and preferably DGEBA, optionally in combination with one or more of epoxy resin(s) selected from: (iii) an epoxy phenol novolac (EPN) resin; or (iv) an epoxy cresol novolac (ECN) resin.

In a preferred embodiment, the curable resin is selected from curable resins which comprise (i) a first difunctional epoxy resin, preferably selected from bisphenol A or bisphenol F epoxy resins, and preferably DGEBA; and/or (ii) a second difunctional epoxy resin, preferably selected from bisphenol A or bisphenol F epoxy resins, and preferably DGEBA, optionally in combination with one or more of epoxy resin(s) selected from: (iii) a trifunctional epoxy resin, preferably triglycidyl aminophenol, preferably triglycidyl para-aminophenol (TGPAP); and/or (iv) a tetrafunctional epoxy resin, preferably tetraglycidyl diaminodiphenylmethane (TGDDM).

Thus, an epoxy resin may be selected from N,N,N',N'-tetraglycidyl diamino diphenylmethane (e.g. grades MY 9663, MY 720 or MY 721; Huntsman); N,N,N',N-tetraglycidyl-bis(4-aminophenyl)-1,4-diisopropylbenzene (e.g. EPON 1071; Hexion); N,N,N',N'-tetraglycidyl-bis(4-amino-3,5-dimethylphenyl)-1,4-diisopropylbenzene, (e.g. EPON 1072; Hexion); triglycidyl ethers of p-aminophenol (e.g. MY 0510; Hunstman); diglycidyl ethers of bisphenol A based materials such as 2,2-bis(4,4'-dihydroxy phenyl) propane (e.g. Araldite LY1556 (Huntsman), or Epikote 828 (Hexion)) and higher molecular weight diglycidyl ethers of bisphenol A based materials such as those with an epoxy equivalent weight of 400-3500 g/mol (e.g. Epikote 1001 and Epikote 1009); glycidyl ethers of phenol novolak (or novolac) resins (e.g. DEN 431 or DEN 438; Dow); diglycidyl 1,2-phthalate (e.g. GLY CEL A-100); diglycidyl derivative of dihydroxy diphenyl methane (Bisphenol F) (e.g. PY 306; Hunstman). These resins are low to medium viscosity at room temperature, making them easy to process. However, their room temperature reactivity is rather low, high temperature curing with suitable accelerators is normally required.

The epoxy component may also be an aliphatic epoxy resin, which includes glycidyl epoxy resins and cycloaliphatic (alicyclic) epoxide. Glycidyl epoxy resins include dodecanol glycidyl ether, diglycidyl ester of hexahydrophthalic acid, and trimethylolpropane triglycidyl ether. These resins typically display low viscosity at room temperature (10-200 mPas) and can be used to reduce the viscosity of other resins. Examples of suitable cycloaliphatic epoxides include diepoxides of cycloaliphatic esters of dicarboxylic acids such as bis(3,4-epoxycyclohexylmethyl) oxalate; bis(3,4-epoxycyclohexylmethyl)adipate; bis(3,4-epoxy-6-methylcyclohexylmethyl)adipate; and bis(3,4-epoxycyclohexylmethyl)pimelate. Examples of alicyclic epoxies include vinylyclohexene epoxide; divinylyclohexene diepoxide limonene epoxide; limonene diepoxide dicyclopentadiene diepoxide.

The viscosity of the epoxy resin composition can be reduced by modifying the epoxy component. The epoxy component can comprise at least one multifunctional epoxy resin and/or one or more monofunctional epoxy resins. Monoepoxides include, but are not limited to, styrene oxide, cyclohexene oxide and the glycidyl ethers of phenol, cresols, tert-butylphenol, other alkyl phenols, butanol, 2-ethylhexanol, $C_4$ to $C_{14}$ alcohols, and the like, or combinations thereof.

Fibers: Useful reinforcing fibre materials may include customary fibres which are used for fibre reinforcement of materials. Suitable reinforcing fibres include organic or inorganic fibres, natural fibres or synthetic fibres, in the form of fibre strands (rovings), or staple fibre formed of continuous fibre such as fibreglass, silicon carbide or disilicon carbide containing titanium fibre, carbon and/or graphite fibre, boron fibre, quartz, aluminium oxide, carbon nanotubes, nano composite fibres, polyaramide fibres, poly(p-phenylene benzobisoxazole) fibre, ultrahigh molecular weight polyethylene fibres, high and low density polyethylene fibres, polypropylene fibres, nylon fibres, cellulose fibres, natural fibres, biodegradable fibres and combinations thereof. Other suitable fibres include silicon carbide fibre; and silicon carbide fibres containing titanium.

In some embodiments of the present disclosure, the first and second curatives are mixed by mechanical, magnetic, or centrifugal stirrers until a homogeneous, particle free liquid, or low melting point solid is obtained. Generally, this is at ambient temperatures, but one or more components may be warmed to either melt or help in dissolution.

In some embodiment of the present disclosure, the resin and curative mixture are mixed together by meter-mixing before impregnating the filaments in the fibre tows (each tow comprising a plurality of fibre filaments). Meter-mixing involves pumping the resin and curative individually and synchronously at various, but known flow rates to a mix head device so that a range of resin:curative mix ratios may be obtained. The resin, curative and mix head may be preheated in the meter mix equipment to adjust the unmixed and mixed viscosities as appropriate. The mixed material can then be dispensed through either a static or dynamic mix nozzle, applying the mixed resinous material directly onto the fibre tows.

The mix ratio of resin to curative (resin:curative or R:C) can be adjusted using meter mix equipment to a variety of values. The advantage of this is that the properties of the mixed resin can be controlled and adjusted at will. For instance a higher curative content (a lower R:C ratio) will enable B-staging to occur at a faster rate and to a higher percentage cure level. This may reduce the length of time the B-staged material is stable and may also alter the final cure rate and the properties (such as cured Tg) of the final cured material. A lower curative content (a higher R:C ratio) may enable the B-stage to be attained at a slower rate, to reach a lower percentage cure level and to be stable for longer. There will also be an effect on final cure and final cured properties. The amount of tack and flexibility of the B-staged material before final curing can also be controlled by this ratio. As an example, the ratio of the resin to the curative may be greater than or equal to about 5. For a curative that functions as both a low temperature curative and a high temperature curative, the ratio of the resin to the curative is preferably greater than or equal to about 10 and more preferably greater than or equal to about 20. In some embodiments, R:C ratio is 5 to 20.

The ratio of the (RT/HT) curatives can also be used to control the properties of the B-staged material and of the final cured composite. A high RT:HT ratio enables a high level of B-staging (higher B-stage Tg, lower tack, lower flexibility), but may result in a low final cured part Tg. Conversely, a low RT:HT ratio means less B-staging (lower B-stage Tg, higher tack, higher flexibility), but may provide a high final cured Tg.

One application of the curable resin composition of the present disclosure is rapid press moulding processes to make cured composite parts. This is generally done in two stages. After the resin is applied to the fibre tows, the tows are wound around a mandrel in a filament winding process as described above. Once the appropriate winding pattern, multilayer thickness has been achieved, the impregnated woven construction is removed from the mandrel and laid flat. The first part of the cure is the B-staging of the resin to increase the viscosity of the resin such that a prepreg-like construction is obtained with low resin flow and resin transfer to protective films. It retains an amount of flexibility and tack similar in levels to conventional prepregs.

The material can be cured to a final part either before or after B-staging, but preferably after B-staging to avoid handling and fibre tow distortion problems. The material is B-staged for a length of time that is dependent on the resin, curative compositions (RT:HT ratio), the mix ratio (resin:curative ratio) the temperature (ambient or otherwise). For instance, the material disclosed in Example 1 can be B-staged to an appropriate useful level after 24 hours at RT and is useful for another 24 hours. In another instance, the material disclosed in Example 2 can be B-staged to an appropriate useful level after 24 hours at RT and is stable for another 48 hours.

The material can be cured to a maximum value in a press (compression moulding), autoclave or by vacuum bag-oven method. The cure cycle is dependent on the composition (RT:HT ratio, resin:curative ratio) as well as the temperature of the press or other equipment. For instance, the material of Example 1 may be press cured using a cure cycle of 5 m/140° C. This can be done either before B-staging (which presents handling problems) or preferably after B-staging when the material can be handled like conventional prepreg. The length of time that is required for the appropriate level of B-staging to be observed and the length of time for which the B-stage is stable is dependent upon the curative components (for example, see FIG. 7), the curative component ratios within the curative blend, and the ratio of the curative blend to the resin blend. Careful control of all these variables allows the user to generate a bespoke system for the application in use.

Preferably, the glass transition temperature of the resin is greater than 100° C., preferably greater than 120° C. from cure cycles of <10 minutes, preferably, <5 minutes.

The present resin is useful in making prepreg like materials via a solvent free, low viscosity route. Prepregs are typically made by hot melt blending of raw material ingredients and extruding the blend as a film that can be consolidated or pressed onto unidirectional fibres or fabric immediately or at a later stage. Alternatively, the blend of raw materials can be dissolved in a solvent and the solution applied to the fibres or fabric. In this process, the solvent is later removed by evaporation. Heat or solvent is used to lower the viscosity of an otherwise semi-solid resin blend to affect impregnation of the filaments/fibres in the tows. When the blend is cool or the solvent removed, the viscosity increases such that the resin flow from the fibres is much lower and transfer to protective plastic films is minimal. In the present disclosure, the low viscosity resin (for instance, Example 1) can be applied at low temperatures (usually RT) to fibres, tows or fabrics and the B-staging will increase the viscosity to achieve the same low value for resin flow and resin transfer to protective films.

Preferably, the thickness of the FW wound prepreg blank is no more than about 40 mm, preferably no more than about 10 mm, preferably no more than about 3 mm, and preferably at least about 0.1 mm, preferably at least about 0.5 mm, preferably from about 1 mm. The preferred range is about 0.5 mm to about 10 mm and the more preferred range is about 1 mm to about 3 mm.

The prepregs are useful in the automotive and aerospace industries. The automotive industry typically uses the prepregs as follows.

To form a moulded article, a single or a number of the above described filament wound blanks are laid up into or onto a mould (often referred to as moulding tool). Conventionally, pre-preg plies within the lay-up are positioned in a selected orientation with respect to one another. For example, pre-preg lay-ups may comprise pre-preg plies having uni-directional fibre arrangements, with the fibres in each ply oriented at a selected angle, e.g. 0°, 45°, or 90°, with respect to the largest dimension (typically defined as the length) of the lay-up. Once in place, the pre-pregs in the lay-up can be cured as described below. In some embodiments, the orientations of the fibres are determined by the weaving pattern during the FW process and so the stacking and stacking arrangement processes to form the prepreg "lay-up" are eliminated. The weaving pattern can be repeated creating a multilayer structure to achieve appropriate lay-up thickness.

The moulded articles prepared from a single filament wound blank or a stack of such filament wound blanks are particularly suitable as components for transport applications, and particularly the automotive industry. The automotive components prepared according to the present disclosure are particularly suitable as mid- or high-volume automotive parts (for instance, structural parts such as body or chassis components, e.g. spare wheel well or boot lid etc.), in which cost and speed of production are paramount. The present disclosure provides a process which provides advantages of efficiency and economy. The lay-up time according to the present disclosure is significantly reduced, allowing a reduction in the unit cost per component and/or allowing the high volume of component production desired in the automotive industry. The term "automotive industry" herein is a particular reference to road transport vehicles, including cars, buses, trucks and motorcycles and the like.

The following non-limiting examples serve to illustrate certain embodiments of the present disclosure.

EXAMPLES

Comparative A

Bisphenol A based epoxy resin (Araldite LY1556) was mixed with RT curative only (TTD) and allowed to react over 200 hours at RT. The reactive epoxy/curative blend was prepared by mixing the bisphenol A epoxy resin and the above curative at RT by centrifugal mixer until homogeneous. FIG. 1 shows a rapid initial increase in viscosity and glass transition temperature to a stable level for the composition of Comparative A.

Comparative B

Figure 2:
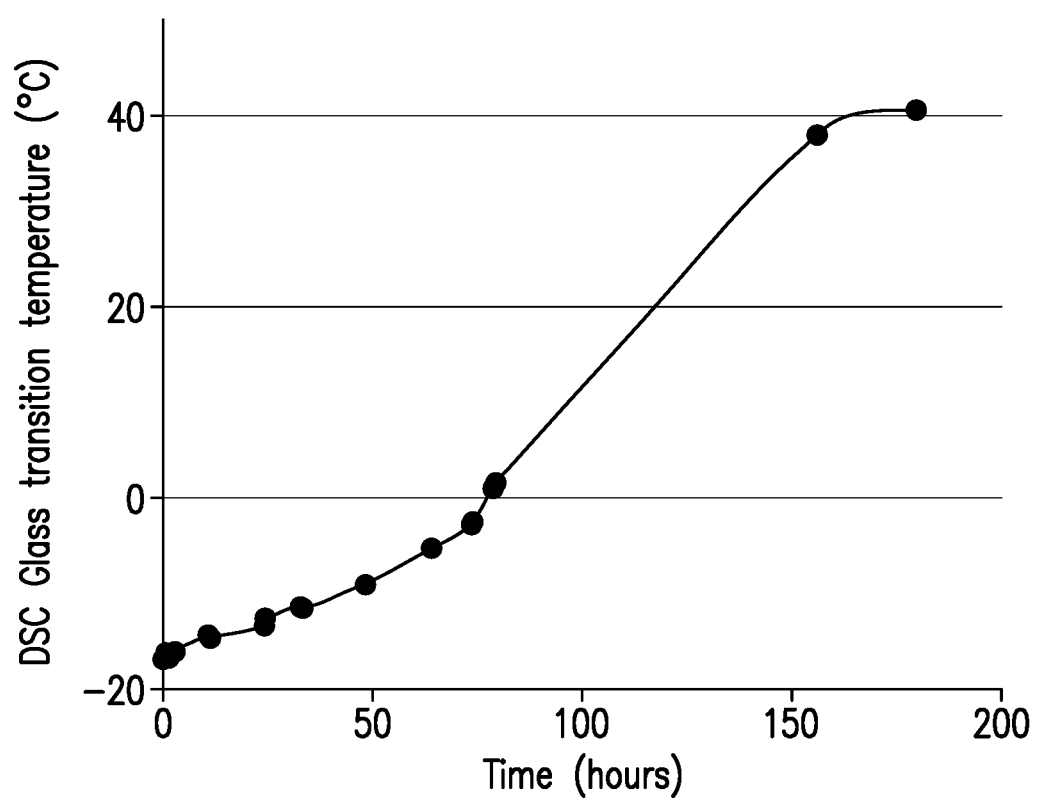
FIG. 2 is shows the development of B-stage Tg with time of Comparative B.

Bisphenol A based epoxy resin (Araldite LY1556) was mixed with HT curative only (EMI) and allowed to react over 200 hours at RT. The reactive epoxy/curative blend was prepared by mixing the bisphenol A epoxy resin and the above curative at RT by centrifugal mixer until homogeneous. FIG. 2 shows a continuous, slow increase in glass transition temperature for the composition of Comparative B compared with Comparative A. Note that no plateau region is shown representing a stable B-stage.

Example 1

An RT curative and HT curative were combined to form a curative blend. The curative blend was prepared by mixing TTD and molten EMI at RT at a ratio of 5:4 by weight by magnetic stirrer until homogeneous. Bisphenol A based epoxy resin (eg Araldite LY1556) was mixed with the curative blend at a ratio of 100:8 by weight (resin:curative)

by centrifugal mixing at RT to form a homogeneous composition. The mixture was allowed to react over 200 hours at RT.

Figure 3:
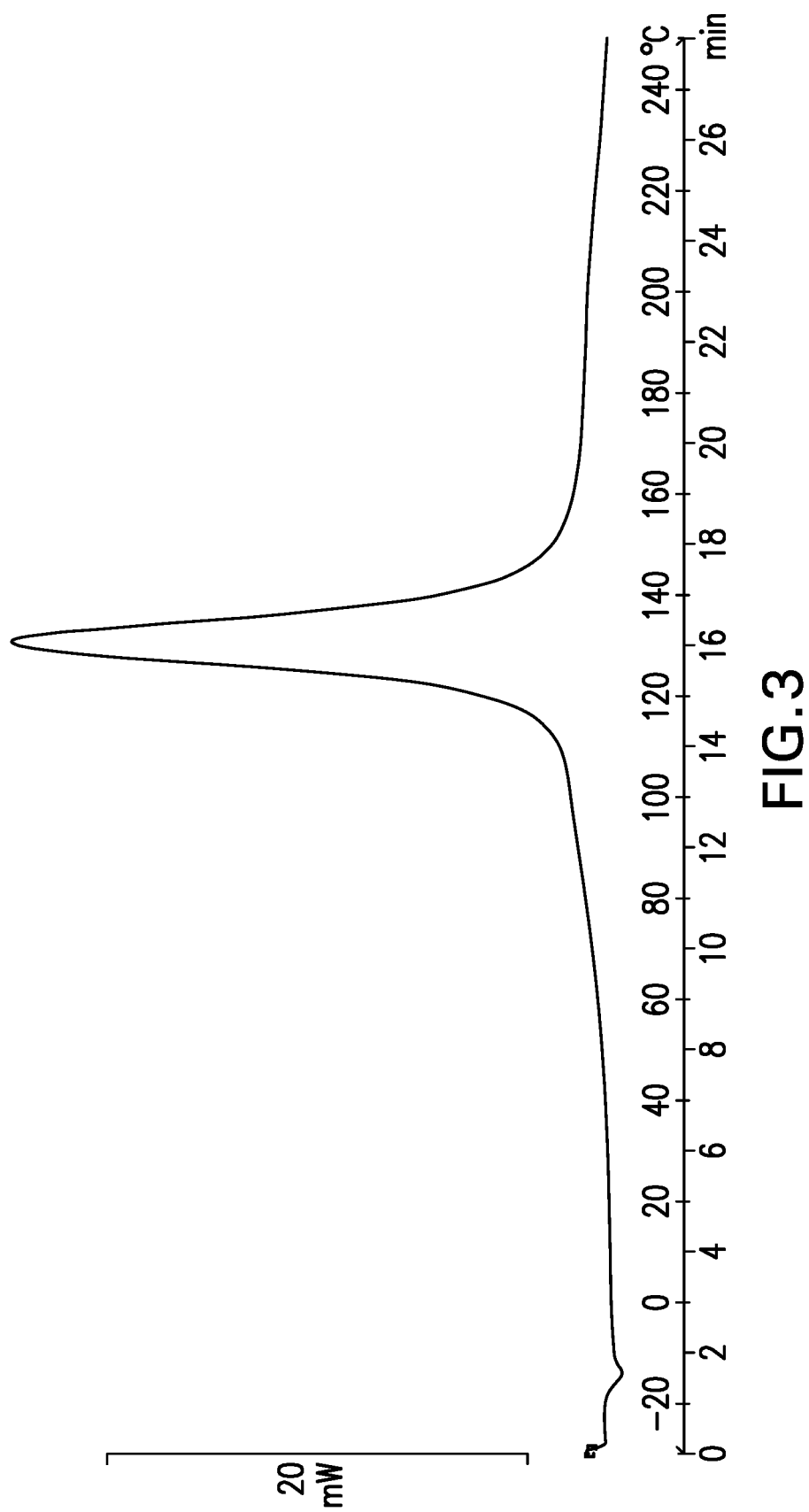
FIG. 3 is a DSC thermogram of Example 1, which represents an embodiment of the present disclosure.

FIG. 3 shows the DSC analysis for this composition. FIG. 3 indicates that the final curing reaction, effected by the EMI is very rapid in the region 120° C.-140° C.

Figure 5:
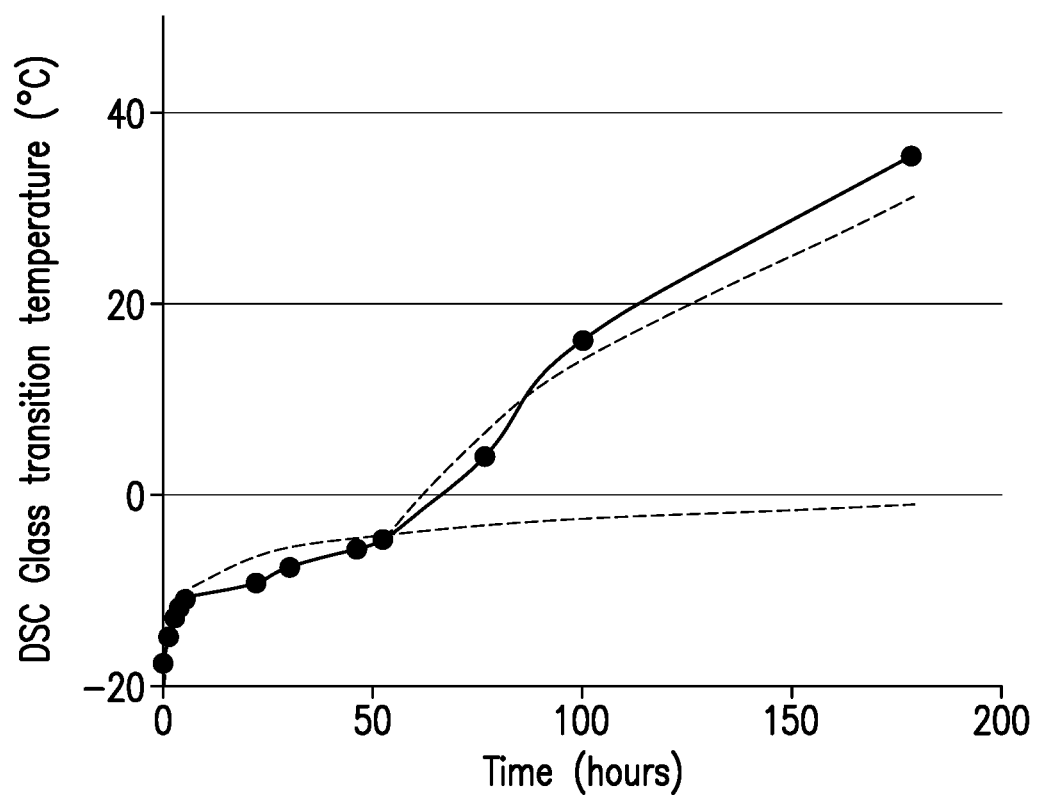
FIG. 5 shows the development of B-stage Tg with time of Example 1.

FIG. 5 shows the uncured glass transition temperature evolution for this composition. The dotted lines in FIG. 5 are mathematical fitted curves. It can be seen from FIG. 5 that there is a rapid initial increase in uncured Tg due to B-staging caused by the reaction of epoxy with TTD. This is followed by a plateau region of B-stage stability before advanced ageing of the composition caused by the slower reaction of the EMI with the epoxy resin.

Figure 8:
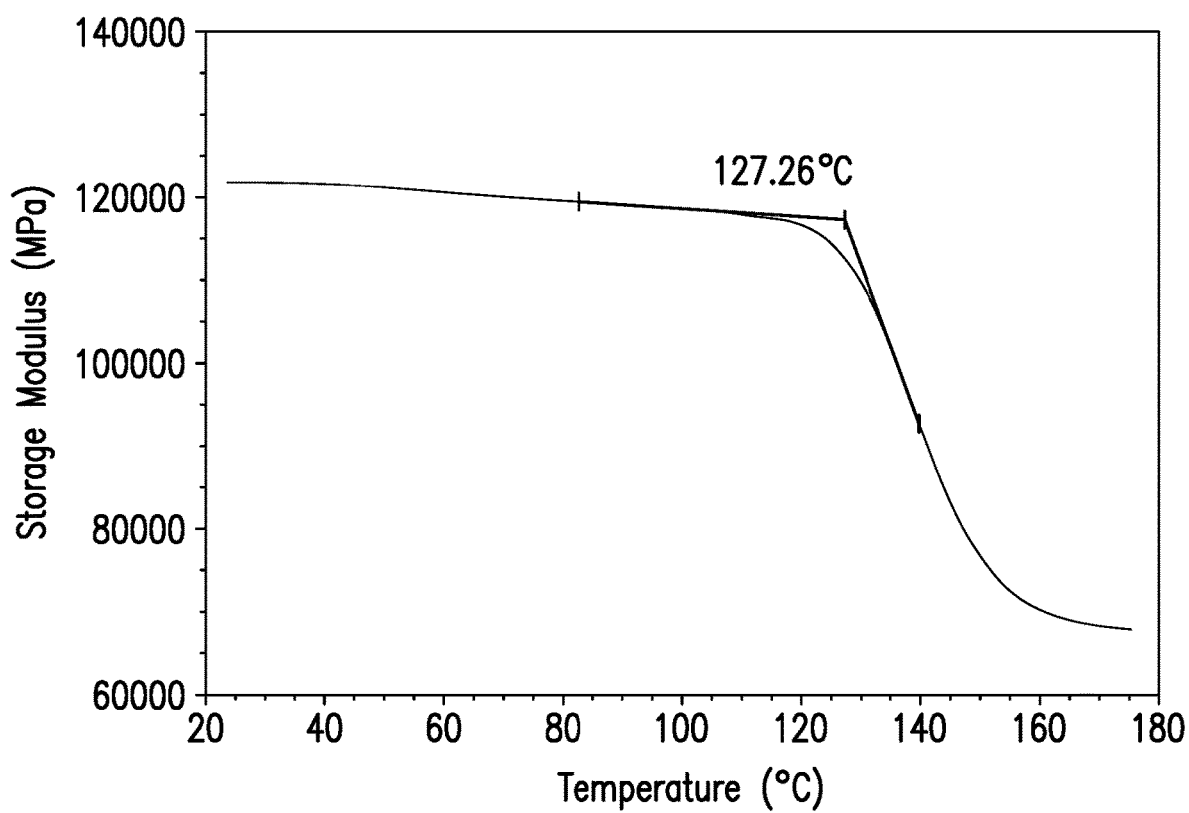
FIG. 8 is a DMA trace of Example 1 resin FW impregnated at room temperature (RT) into T700 UD carbon fibres (41% resin by weight), B-staged for 24 hours at RT and then cured in a press maintained at 150° C. for 3 minutes.

FIG. 8 shows a DMA trace from a sample of Inventive Example 1 that had been impregnation by FW process onto Toray T700 UD carbon fibres at RT, B-staged at RT for 24 hours, and then cured in a press maintained at 150° C. for 3 minutes. It is clear that the cured Tg is recorded as about 127° C.

DSC, infra-red spectroscopy, nuclear magnetic resonance, and HPLC are useful analytical methods for confirming the presence of the resin, RT curative, HT curative, and the amounts thereof.

Example 2

An RT curative and HT curative were combined to form a curative blend. The curative blend was prepared by mixing TTD and molten EMPI at RT at a ratio of 1:1 by weight by magnetic stirrer until homogeneous. Bisphenol A based epoxy resin (eg Araldite LY1556) was mixed with the curative blend at a ratio of 100:10 by weight (resin:curative) by centrifugal mixing at RT to form a homogeneous composition. The mixture was allowed to react over 200 hours at RT.

Figure 4:
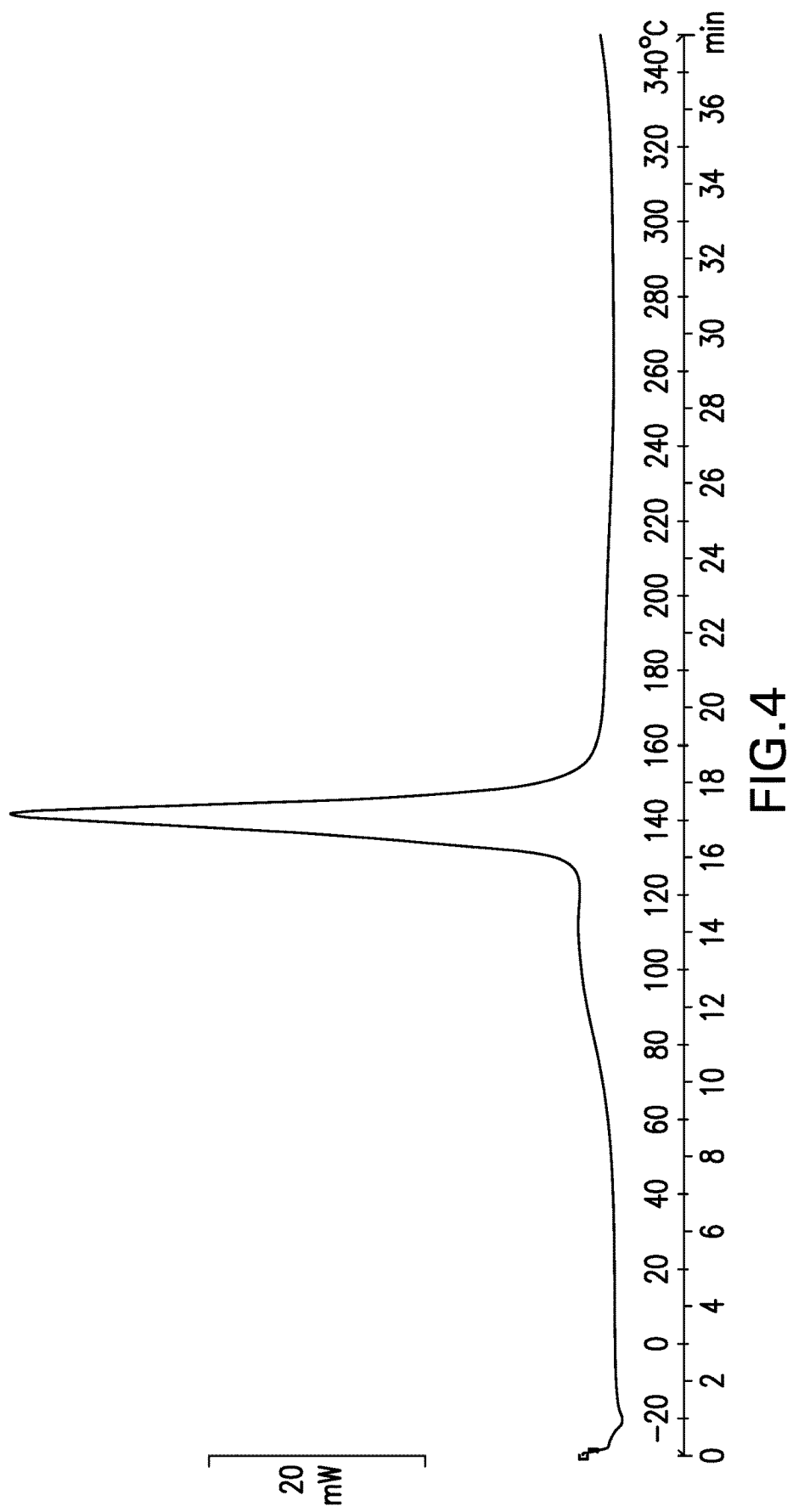
FIG. 4 is a DSC thermogram of Example 2, which represents another embodiment of the present disclosure.

FIG. 4 shows the DSC analysis for this resin. FIG. 4 indicates that the final curing reaction, effected by the EMPI is very rapid in the region 130° C.-150° C. This is higher than Inventive Example 1 as EMPI is less reactive than EMI.

Figure 6:
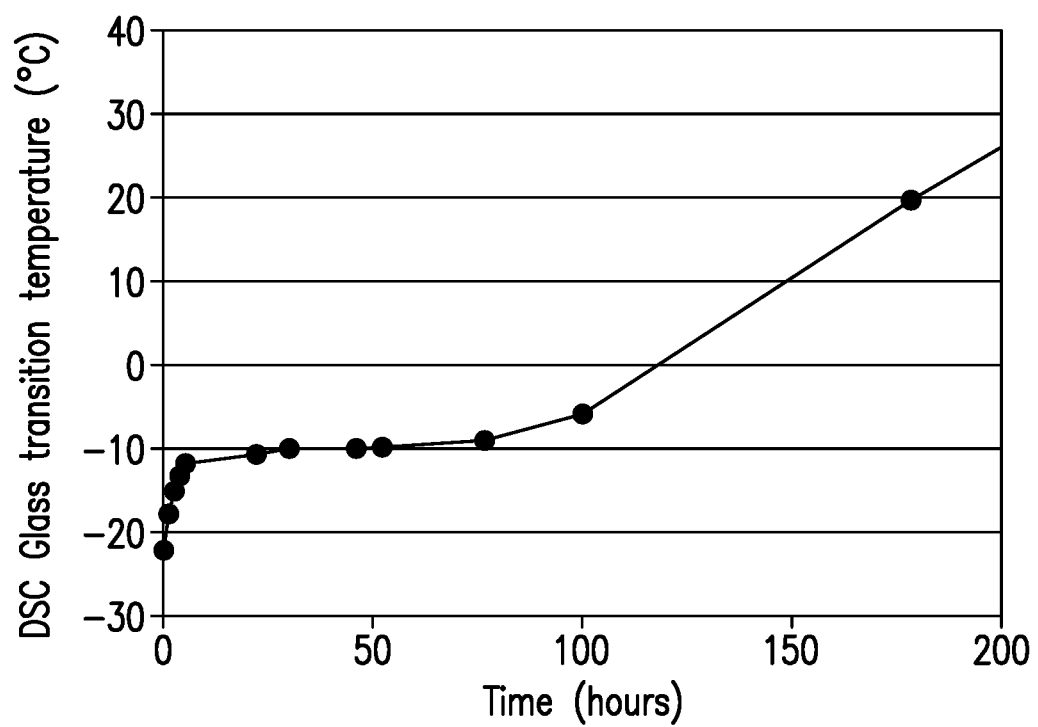
FIG. 6 shows the development of B-stage Tg with time of Example 2.

FIG. 6 shows the uncured glass transition temperature evolution for this resin. It can be seen from FIG. 6 that there is a rapid initial increase in uncured Tg due to B-staging caused by the reaction of epoxy with TTD. This is followed by a plateau region of B-stage stability (longer than in Inventive Example 1) before advanced ageing of the composition caused by the slower reaction of the EMI with the epoxy resin.

Figure 7:
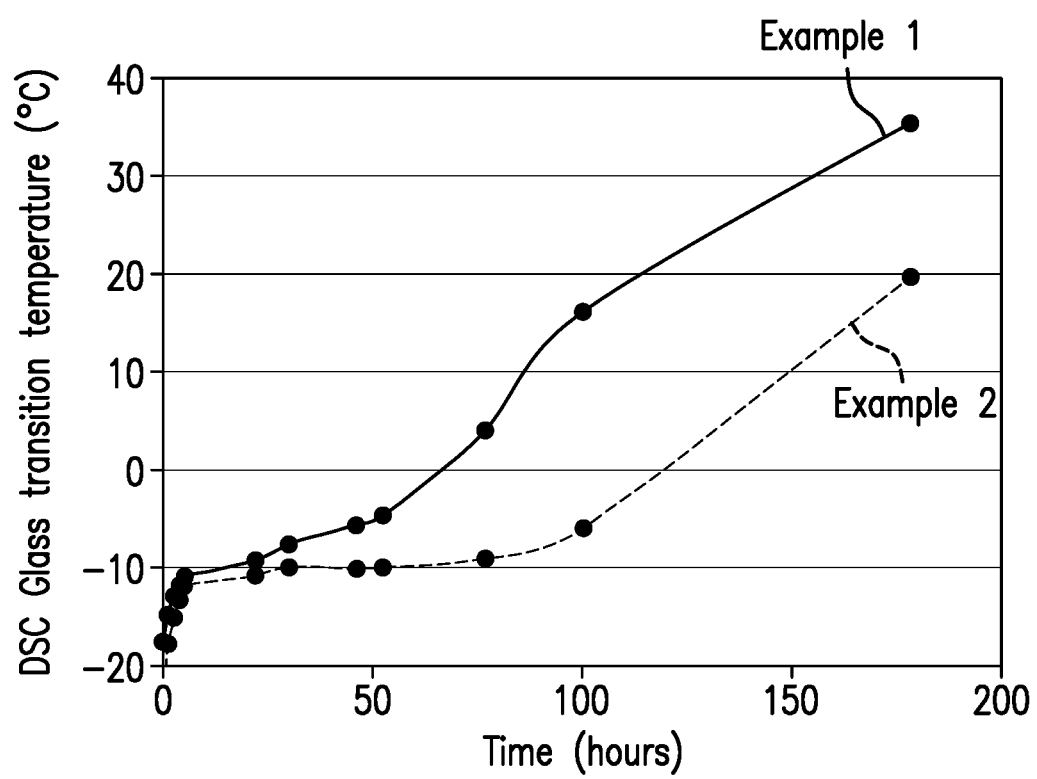
FIG. 7 shows the development of B-stage Tg with time of Examples 1 and 2.

As described above the useful lifetime ("outlife") of the B-staged material is dependent on the curative compounds, the RT:HT ratio, the resin:curative ratio, and physical factors such as temperature. FIG. 7 exemplifies this control where the difference in outlife between Inventive Example 1 and Inventive Example 2 are shown. Inventive Example 1 makes use of EMI as an HT catalyst which is reactive even at RT and hence the formulation's outlife is relatively short. Inventive Example 2 makes use of EMPI as HT catalyst which is less reactive at RT than EMI and so the formulation's outlife is much longer. The difference in behaviour under this control is demonstrated in FIG. 7.

DSC, infra-red spectroscopy, nuclear magnetic resonance, and HPLC are useful analytical methods for confirming the presence of the resin, RT curative, HT curative, and the amounts thereof.

The following Table 1 summarizes the data from U.S. Pat. No. 9,057,002 for comparison with the data of Examples 1 and 2 of the present disclosure. Note that the resin of Examples 1 and 2 of the present disclosure has a higher resin:curative (E:H) ratio than the prior art compositions. Example B of U.S. Pat. No. 9,057,002 was reported to gel after ramping from ambient to 160° C. at 30° C./min and holding at 160° C. for 3 minutes. Thus, Example B is incapable of being B stage-able at room temperature and does not fully cure within 5-10 minutes.

Another advantage of the present system compared to Example B (and other solvent-borne compositions) is that the difficulty of removing the solvent before final cure is eliminated. Residual solvents are known to have adverse effects on cured properties. In the case of the composition of the present disclosure, low viscosity for good impregnation of fibre tows is achieved by low viscosity resins and curatives and not through dissolution in solvents.

TABLE 1

| U.S. Pat. No. 9,057,002 | | Epoxy (E) | LT hardener | HT hardener | LT:HT | E:H |
|---|---|---|---|---|---|---|
| Example 1 | | DVBO | DETA | DETDA | | |
| | mmoles | 41 | 8 | 33 | 0.24 | 1.00 |
| | g | 3.35 | 0.17 | 1.47 | 0.12 | 2.04 |
| Example 2 | | DVBO | bisphenol A | DETDA | | |
| | mmoles | 0.5 | 0.25 | 0.25 | 1.00 | 1.00 |
| | g | 40 | 28 | 11 | 2.55 | 1.03 |
| Example 3 | | DER383 | DETA | OTB | | |
| | mmoles | 5 | 1 | 4 | 0.25 | 1.00 |
| | g | 0.91 | 0.03 | 0.06 | 0.50 | 10.11 |
| Example 4 | | DEN438 | DETA | DETDA | | |
| | mmoles | 7.4 | 1.48 | 5.91 | 0.25 | 1.00 |
| | g | 1.39 | 0.031 | 0.26 | 0.12 | 4.78 |
| Example 5 | | DER354 | DETA | DETDA | | |
| | mmoles | 2.99 | 0.6 | 2.4 | 0.25 | 1.00 |
| | g | 0.5 | 0.012 | 0.11 | 0.11 | 4.10 |
| Example 6 | | Unoxol DGE | DETA | DETDA | | |
| | mmoles | 3.9 | 0.78 | 3.11 | 0.25 | 1.00 |
| | g | 0.5 | 0.016 | 0.14 | 0.11 | 3.21 |
| Example B | | XZ92530 | XZ92535 | 2PI | | |
| | mmoles | 77.1 | 22.9 | 0.4 | 57.25 | 3.31 |
| | g | 314.9 | 128.7 | 6.31 | 20.40 | 2.33 |
| Example 1 of present disclosure nominal E:H mix ratio = 100:8 | | LY1556 | TTD | EMI | | |
| | | 100 | 4.4 | 3.6 | 1.25 | 12.5 |
| Example 2 of present disclosure nominal E:H mix ratio = 100:10 | | LY1556 | TTD | EMPI | | |
| | | 100 | 5 | 5 | 1.00 | 10 |

The invention claimed is:

1. A method for making a composite material, comprising:
preparing a curable resin composition comprising: (a) at least one thermosettable resin; and (b) a curative, wherein the curative (b) comprises: (i) a mixture of at least one low temperature curative and at least one high temperature curative; or (ii) a dual function curative compound having a low temperature curative part and a high temperature curative part;
applying the curable resin composition to one or more continuous fibre tow(s) to impregnate the fiber tow(s), each fibre tow comprising a plurality of fibre filaments;

winding the impregnated fiber tow(s) around a mandrel in a filament winding process to form a woven structure;

removing the woven structure from the mandrel to form a blank;

allowing B-staging of the blank at a temperature of about 23° C. to about 25° C., wherein said B-staging involves an addition reaction between the at least one thermosettable resin (a) and either the at least one low temperature curative of the mixture (i) or the low temperature curative part of the dual function curative compound (ii), and wherein said B-staging results in a partially cured resin material having an isolatable intermediate state such that the resin can still be stimulated by heat or radiation to achieve a maximum cured state;

moulding said blank or a plurality of said blank in a mould; and curing the moulded blank(s) in a final cure cycle at a temperature of 40° C. to 200° C. to form a fully cured moulded article, wherein said curing involves catalytic curing of the partially cured resin material with either the at least one high temperature curative of the mixture (i) or the high temperature curative part of the dual function curative compound (ii).

2. The method of claim 1, wherein the curative (b) comprises the mixture (i) of at least one low temperature curative and at least one high temperature curative.

3. The method of claim 2, wherein:

the least one low temperature curative is selected from: isophorone diamine (IPDA); trimethylhexamethylene diamine; diethylenetriamine (DETA); triethylenetetramine (TETA); tetraethylenepentamine (TEPA); TCD-diamine; N,N-dimethylpropane-1,3-diamine; N,N-diethylpropane-1,3-diamine; 1,2-diaminocyclohexane; 1,3-diaminocyclohexane; 1,3-bisaminocyclohexylamine; 1,3-bis(aminomethyl)cyclohexane (1,3-BAC); 1,2-bis(aminomethyl)cyclohexane; 4,4'-methylenebis(cyclohexylamine); 4,4'-methylenebis(2-methylcyclohexylamine); N-aminoethylpiperazine (AEP); Bis(aminopropyl)piperazine (BAPP); poly(oxyalkyl)diamines; and 4,7,10-trioxatridecane-1,13-diamine (TTD); and the at least one high temperature curative is selected from: 1-cyanoethyl-2-ethyl-4-methylimidazole (EMPI), 2-ethyl-4-methylimidazole (EMI), 1-cyanoethyl-2-methylimidazole, 1-methyl imidazole, 4-methyl imidazole, 1-benzyl-2-phenylimidazole, 1-benzyl-2-methylimidazole, 1-(3-aminopropyl)imidazole (API), 1,2-dimethylimidazole, 1-cyanoethyl-2-undecylimidazole, and 4.5-bis[(2-cyanoethoxy)methyl]-2-phenyl-1H-imidazole-1-propiononitrile.

4. The method of claim 1, wherein the curative (b) comprises the mixture (i) of at least one low temperature curative and at least one high temperature curative, and the at least one high temperature curative is an imidazole.

5. The curable resin composition of claim 4 wherein the imidazole is 2-ethyl-4-methyl imidazole (EMI).

6. The method of claim 1, wherein the curative (b) comprises the dual function curative compound (ii) having a low temperature curative part and a high temperature curative part.

7. The method of claim 6, wherein the dual function curative compound (ii) having a low temperature curative part and a high temperature curative part is selected from: N-(3-aminopropyl)imidazole (API), N,N-diethylpropane diamine (DEPD), and N,N-dimethylpropane diamine (DMPD).

8. The method of claim 1, wherein the one or more continuous fibre tow(s) is/are carbon fibre tow(s).

9. The method of claim 1, wherein the final cure cycle is carried out for less than 10 minutes.

10. The method of claim 1, wherein the at least one thermosettable resin (a) in the curable resin composition is monofunctional or multifunctional epoxy resin.

11. The method of claim 1, wherein the curable resin composition is solvent-free.

12. The method of claim 1, wherein the weight ratio of the at least one thermosettable resin (a) to the curative (b) in the curable resin composition is greater than or equal to 5.

13. The method of claim 12, wherein the weight ratio of the at least one thermosettable resin (a) to the curative (b) in the curable resin composition is 5 to 20.

* * * * *